Sept. 26, 1939.  W. V. SAUTER ET AL  2,173,885
FLUID CONTROL MECHANISM
Original Filed Jan. 14, 1936   2 Sheets-Sheet 2
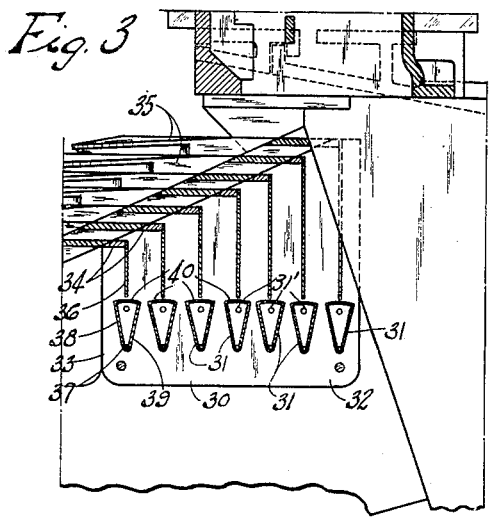
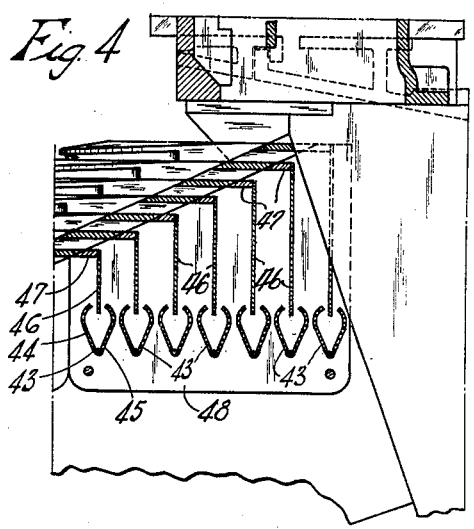
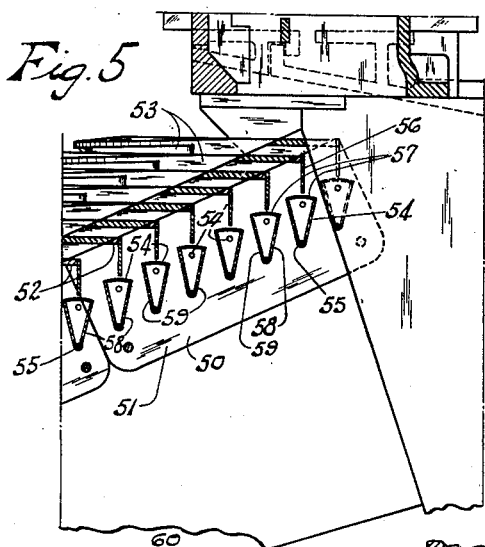
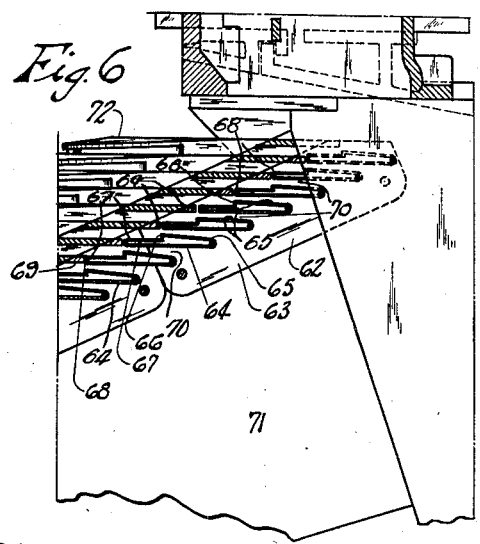
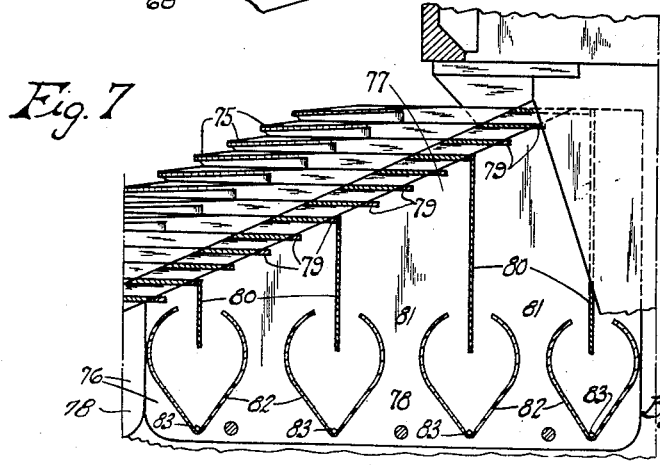
Inventor
William V. Sauter and
Howard F. Lawrence Patented Sept. 26, 1939

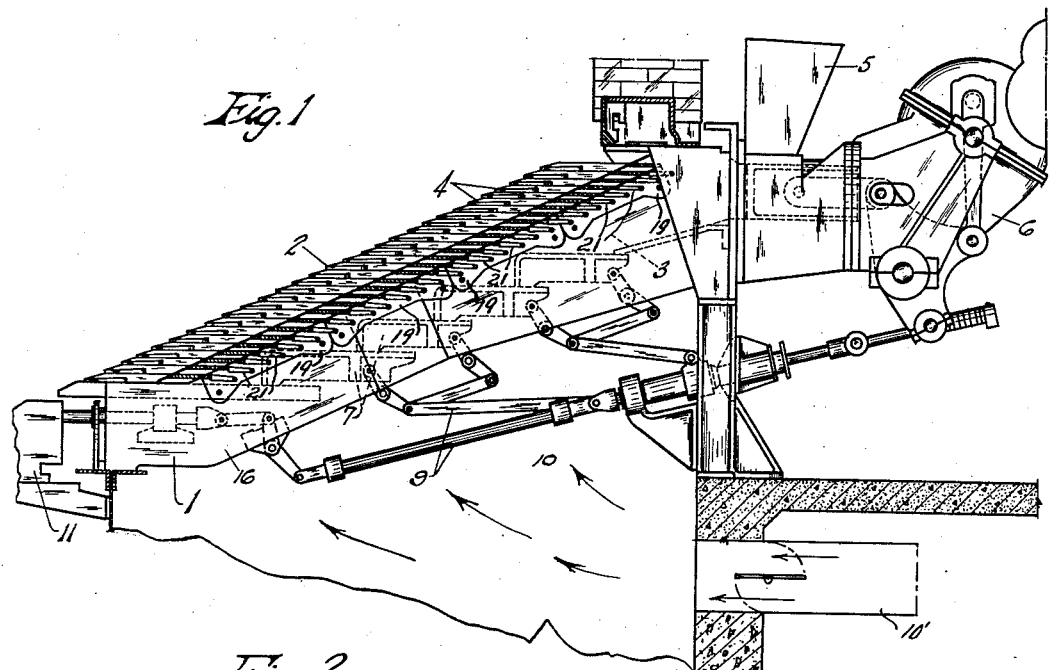

2,173,885

UNITED STATES PATENT OFFICE 2,173,885

FLUID CONTROL MECHANISM

William V. Sauter and Howard F. Lawrence, Philadelphia, Pa., assignors to American Engineering Company, Philadelphia, Pa., a corporation of Pennsylvania Application January 14, 1936, Serial No. 59,042
Renewed April 9, 1938

10 Claims.  (Cl. 110—44)

This invention relates to fluid systems, and more particularly to systems employed to control the flow of draft air to stoker furnaces.

One object of the present invention is to provide a generally improved arrangement of dampers which controls the flow of draft air to the individual tuyères or groups of tuyères of a stoker furnace.

Another object is to provide a damper mechanism for stoker furnaces which controls the flow of draft air to the individual tuyères or groups of adjacent tuyères, said dampers being so disposed as to overlap wholly or in part so that the pressure of the air flowing past one or more of the dampers will control, to a certain extent, the operation of adjacent dampers.

Other and further objects will become apparent as the description of the invention progresses.

Of the drawings:

Fig. 1 is a longitudinal view partly in section taken through one of the tuyère chambers of a stoker furnace showing control dampers associated with each of the tuyères thereof.

Fig. 2 is an enlarged view partly in section taken through the upper end of one of the tuyère chambers of a stoker showing the preferred type of dampers associated with the tuyères thereof.

Fig. 3 is a view similar to Fig. 2, but showing an alternative form of damper mechanism.

Fig. 4 is a view similar to Fig. 3, but showing a further type of damper mechanism.

Fig. 5 is a similar view showing a still further arrangement of dampers.

Fig. 6 is a similar view showing a still further arrangement of dampers for the tuyères, and Fig. 7 is an enlarged view partly in section showing dampers of the type shown in Fig. 4 provided for groups of tuyères.

It is believed to be a fundamental principle of hydraulics that the total pressure of a fluid flowing through a duct or passage is equal to the sum of the static and velocity pressures. The rate of flow through such a duct is determined by the velocity pressure or velocity head. Therefore, it is apparent that as the flow increases a certain amount of the static pressure is converted into velocity pressure, and when no flow exists in the ducts the total pressure is substantially static pressure.

The present invention, for the purpose of illustration, is shown applied to a stoker of the underfeed type, although it is apparent that the invention is equally applicable to other types of stokers, as well as other apparatus, wherein control of a fluid is desired. As illustrated in the drawings, each tuyère or group of tuyères of the stoker is provided with a damper. These dampers are so disposed as to overlap partially or wholly, and form with each other communicating passages to the tuyères. In cases where the area of these communicating passages is substantially the same as the area of the tuyère openings, the pressure of the air therein is substantially the same as that flowing through the tuyères. In the present instance the dampers are so arranged that one surface of each is subjected to the pressure of the air flowing through one such passage, while another surface is subjected, in part or wholly, to the pressure of the air flowing through an adjacent tuyère. In cases where the dampers overlap in part, a portion of this last mentioned surface is subjected to the pressure of the air at the source of supply, which, in effect, is substantially the total pressure of the air flowing through any of the ducts. It therefore is seen that when any flow exists through the tuyères each damper is subjected to differential pressure. In actual practice the weight of the dampers is so proportioned as to counteract a predetermined differential pressure so that they will remain open during normal conditions of operation. The flow of air past the dampers and through the tuyères is controlled by the density of the fuel bed, and the weight of each of the dampers is so proportioned that they will remain open until the fuel bed becomes abnormally thin, at which time the differential pressure acting on the dampers associated with the tuyères supporting such portions of the fuel bed becomes sufficiently great to operate them toward closed position.

It therefore is seen that should thin or extremely porous spots develop in the fuel bed, the damper or dampers controlling the air thereto will close. When this occurs greater inlet openings will be provided in the passages leading to the tuyères supporting the adjacent thicker or less porous portions of the fuel and as a result the latter will receive a greater quantity of air. The dampers therefore tend to maintain the fuel bed normally uniform throughout and prevent blowing of the fuel in the event abnormally thin spots occur therein.

The drawings illustrate a number of different types of damper arrangements, and each will now be described in detail.

Referring to the drawings, numeral 1 indicates a stoker of the inclined grate underfeed type having alternately disposed tuyère rows and retorts 3. Each tuyère row 2 comprises a series of tuyère blocks 4 arranged in superimposed relation and may be of the general type shown and described in United States Patent No. 1,930,908. Fuel is supplied to the stoker from a hopper 5 by any suitable feeding mechanism driven by the power mechanism shown at 6. A series of pushers 7 provided in the bottom of each retort are also driven by the power mechanism 6 through a link and lever mechanism indicated generally by the numeral 9. Draft air is supplied to the fuel bed through the tuyère blocks 4 from a common plenum chamber 10 disposed beneath the stoker. Air is supplied to plenum chamber 10 in accordance with the fuel burning rates, by any suitable fan or blower mechanism (not shown) through a duct 10'. The usual extension grates 11 provided at the lower end of the stoker feed the consumed fuel into an ash pocket or to dump grates (not shown) after a well known fashion.

The terms "front" and "rear" hereinafter employed in the description of the various elements, it is to be understood, relate to those portions thereof extending toward the front or driving mechanism 6, and to those portions extending toward the rear or extension grates 11, respectively, of the stoker.

Each tuyère block 4 comprises a rounded nose or rear portion 12, and a substantially rectangular front portion 12'. A projection 13 depends from each side edge of each tuyère block 4 which space the main body portions thereof so as to form passages 14 therebetween. As shown in Fig. 2, each tuyère block has provided thereon a forwardly extending tailpiece 15 which extends between the side walls 16 of the associated tuyère chamber 17, the forward end of each of which being beveled, as shown at 18.

As shown more particularly in Fig. 2, the fluid control system comprises a series of units 19, each consisting of a frame 20 in which are mounted a series of dampers 21. Each frame 20 comprises a pair of side members 22 which may be secured to the side plates 16 of the associated tuyère chamber in any suitable manner, such as by bolts 23. A series of transverse members 24 arranged in spaced relation connect the side members 22 of the frame 20. Each damper 21 is pivotally mounted on a pin 25 extending between side members 22 and consists of upper and lower substantially flat portions 26 and 27, which terminate in a substantially vertical arcuate rear portion 28. When the dampers are in fully open position each rests upon a stud 29 which retains the same in operative position. To assemble a unit in position, it is placed between the side plates 16 and moved vertically until the transverse members 24 engage the forwardly disposed beveled portions 18 of the tuyère blocks, as shown in Fig. 2. The frames are then secured in position by fastening bolts 23. It will be noted that a portion of the lower surface 27 of each damper is exposed to the plenum chamber 10, and a portion thereof overlaps the upper surface 26 of the next lower damper of the series. The upper surface 26 of each damper also extends beneath a portion of the forward end of the next upper tuyère block 4, as well as the lower surface of the cross member 24 disposed immediately above, thereby forming a passage 29' which communicates with the associated passages 14 disposed between a pair of associated tuyère blocks. Each damper 21 is so weighted as to remain open until subjected to a predetermined differential pressure. The dampers may be so designed as to be of the proper weight, or additional weights 21' may be mounted thereon, as shown in Fig. 2. This differential pressure for a given plenum chamber pressure varies with the density of the fuel bed overlying the associated tuyères. When the density of the fuel bed decreases the resistance to the flow of air through the associated tuyère obviously decreases correspondingly, and consequently the rate of flow therethrough is increased. Now supposing, for example, that the portion of the fuel bed supplied with draft air by one of the passages should become abnormally thin, while the portion thereof supplied with air by the next lower passage remains normal, it is seen that the velocity of the air flowing through the first passage will increase thereby reducing the pressure operating against the upper surface of the associated damper, while the pressure acting on the lower surface of this damper remains the same. The damper, therefore, is subjected to a differential pressure, and when this differential pressure becomes sufficiently great to overcome the weight of the damper, the latter will move upwardly to closed position and thereby shut off the air flow to the abnormally thin portion of the fuel bed. When the dampers 19 are in open position the arcuate portions 28 thereof extend an equal distance above and below the upper and lower sides respectively of the tail pieces 15 of the associated tuyère blocks 12, thereby partially closing the passages 14 on either side of each of said tuyère blocks. Therefore, it is seen that in the event any of the dampers 21 moves upwardly toward closed position, the inlet to the communicating passage of the next lower tuyère will be opened a greater extent thereby permitting a greater amount of air to flow past the next lower damper. Consequently, in the event the fuel bed over the next lower tuyère is of greater density than that of the tuyère next above, it will receive a greater quantity of air. However, if the density of the fuel bed over two or more adjacent tuyère blocks becomes abnormally thin, all of the associated dampers will move upwardly toward closed position inasmuch as the lower surfaces are exposed in part to the plenum chamber pressure. In this manner the proper amount of air will be supplied to the fuel bed under all conditions of operation.

Fig. 3 shows a somewhat different arrangement of dampers. In this construction each unit 30 consists of a series of substantially vertically disposed dampers 31 mounted in a framework 32. Framework 32 consists of side plates 33 connected at the upper ends thereof by a series of cross members 34 arranged in spaced relation and adapted to engage the forward ends of the tuyère blocks 35. Depending from the forward end of each cross member 34 is a substantially vertical partition 36. Each damper 31 is pivotally mounted at the lower end thereof at 37, and consists of substantially flat side plates 38 and 39 which terminate at the upper ends thereof in a substantially arcuate portion 40. In this construction the dampers 31 wholly overlap each other, and the flow of air between any pair of such dampers is controlled by the pressure of the air on either side thereof. When the pressure of the air flowing through the passages is the same, an equal force will be exerted on each side of the dampers, and as a result they will be held in upright position. To prevent the dampers 31 from moving out of operative position, stops 31' are provided. These stops extend inwardly from the side plates 33 of the framework and are disposed midway between the side plates 38 and 39 of the dampers when the latter are in upright position. From the foregoing description it is believed to be apparent that should the rate of flow of fluid through any of the passages increase, thereby creating a reduced static pressure therein, while the rate of flow in adjacent passages remains substantially the same as before, then due to the greater static pressure operating on one side of each of such dampers than on the other side thereof, said dampers will be actuated towards each other to throttle the flow of air in the passage or passages of low pressure while permitting a greater quantity of air to flow through the passages of higher pressure. As the fuel bed builds up over such a thin portion, thereby creating a greater resistance to the flow of air therethrough, the associated dampers tend to move away from each other an extent determined by the relative pressures acting on either side thereof. When the fuel bed is of uniform density throughout the dampers will assume a substantially vertical position, as shown in Fig. 3. In the event, however, that this uniform condition is interrupted, the dampers will respond accordingly to permit greater or lesser quantities of air to pass to the fuel bed, as the case may be. The dampers therefore will automatically adjust themselves so as to assume a position which permits the proper quantity of air to flow to each subdivision of the fuel bed under all conditions of operation.

Fig. 4 shows a somewhat different damper construction. In this case each damper 43 consists of a pair of side members 44 and 45 which are curved at the upper ends thereof, so as to form passages between adjacent dampers of substantially venturi form. The upper ends of members 44 and 45 are spaced apart so as to receive the partitions 46 depending from the cross members 47 of the framework 48 of the unit. By this arrangement the partitions 46 act as stops to prevent movement of the dampers out of operative position. In this construction also the dampers 43 operate so as to move towards closed position when the flow of air through the associated tuyères increases, and to move toward open position when the flow of air decreases.

Fig. 5 shows a still further modification of the present invention. In this construction each unit 50 also comprises a frame 51 having cross members 52 against which the forward ends of the tuyère blocks 53 abut. The dampers 54 of each unit are arranged in an inclined series, each damper being pivotally mounted on a pin 55 extending between the side plates 51 of the unit. A partition 56 extends downwardly from each cross member 52. These partitions are also arranged in an inclined series and the lower ends thereof lie in substantially abutting relation with the upper arcuate portions 57 of the associated dampers. These dampers also comprise a pair of substantially flat side members 58 and 59. In this construction it will be seen that the dampers 54 partially overlap each other and therefore each is controlled to a certain degree by the pressure of the air flowing past adjacent dampers. The lower extremity of the side wall 58 of each damper is also subjected to the pressure of the air in plenum chamber 60. Therefore, while each damper is controlled to a certain extent by the pressure of the air flowing past adjacent dampers, this pressure is offset, to a certain degree, by the plenum chamber pressure also acting thereon. In this construction, like that shown in Fig. 3, each damper 54 is held in operative position by a stop element 54'.

Fig. 6 shows a still further modification of the present invention. This construction is on the order of that shown in Fig. 2, but involves a somewhat different damper construction. In this case also the dampers are pivoted to the side walls 62 of a control unit 63, and comprises a substantially flat bottom surface 64. The upper surface of each damper, however, consists of a slightly inclined flat portion 65 which terminates intermediate the ends of the damper in a short, substantially vertical part 66, and a rearwardly disposed substantially flat portion 67 which is connected at one end to the lower end of said vertical part. Portions 64 and 65 terminate at their rearward ends in a vertically disposed, substantially arcuate portion 68 which lies in substantially abutting relation with the forward end of a cross member 69 extending between the side plates 62 of the unit. In this construction it is seen that the dampers also partially overlap, the rearwardly extending portion of the lower member 64 of each damper overlapping respectively with the inclined portion 65 of the next lower damper of the series, thereby forming a passage 70 therebetween. The portion of the lower surface 64 of each damper extending forwardly of the pivot point of the next lower damper, however, is subjected to the pressure of the fluid in the plenum chamber 71. When any of these dampers move upwardly toward closed position the vertical portion 66 lies in substantially abutting relation with the next upper cross member 69, and the extreme rearward end of the flat portion 67 engages the under side of the next upper tuyère block 72 of the series, thereby preventing the passage of air to the associated tuyère.

Fig. 7 shows the invention applied to groups of tuyères. In this construction the tuyère blocks 75 are divided into groups of four, although it is apparent that they may be divided into groups of other numbers without departing from the invention. In this construction, also, the control units 76 may each comprise a framework 77 consisting of spaced side plates 78 connected at the upper ends thereof by cross members 79, which in assembly engage the forward ends of the tuyère blocks 75. A partition 80 in the present instance depends from every fourth cross member 79 dividing the tuyère blocks into groups of four, and extends between the side plates 78 of the framework 77, defining passages 81 for draft air. A damper 82 is disposed beneath each partition 80 and extends between the side plates of the framework 77. Each damper is pivoted at the lower end thereof at 83, and is generally similar in structure and operation to the dampers 44 shown in Fig. 4. Thus, as previously described, the dampers 82 will move toward or away from each other to permit lesser or greater amounts of air to pass to the fuel bed, as the case may be, depending upon the conditions of the fuel bed supported by the groups of tuyère blocks 75. Other specific types of dampers, obviously, may also be employed in the construction shown in Fig. 7 without departing from the invention.

While the embodiments herein described are admirably adapted to fulfill the objects primarily stated, it is to be understood that the invention is not to be limited thereto, since it may be embodied in other forms, all coming within the scope of the claims which follow.

What is claimed is:

1. In a device of the class described, the combination with an inclined series of tuyère blocks having passages therebetween adapted to receive fluid from a source of supply, of a series of dampers, one for each of said passages for controlling the flow of fluid therethrough, said dampers being disposed in partially overlapping relation so that one side of each is subjected to the pressure of the fluid in its associated passage, while the other side thereof is subjected partially to the pressure of the fluid in the next lower passage and partially to the pressure at said source of supply, whereby when the differential pressure exceeds a predetermined value, said dampers will move toward closed position.

2. In a device of the class described, the combination with a series of tuyère blocks having passages therebetween adapted to receive fluid from a source of supply, of a series of dampers, one for each of said passages, for controlling the flow of fluid therethrough, said dampers being disposed in partially overlapping relation, so that one side of each is subjected to the pressure of the fluid in its associated passage, while the other side thereof is subjected partially to the pressure of the fluid in the next adjacent passage and partially to the pressure at said source of supply, whereby when the differential pressure exceeds a predetermined value said dampers will move toward closed position, and means for holding said dampers in substantially open position until said differential pressure exceeds a predetermined value.

3. In a device of the class described, the combination with a series of tuyère blocks having passages therebetween adapted to receive fluid from the source of supply, of a series of dampers, one for each of said passages, for controlling the flow of fluid therethrough, said dampers being disposed in partially overlapping relation, so that one side of each is subjected to the pressure of the fluid in its associated passage while the other side thereof is subjected partially to the pressure of the fluid in the next adjacent passage, and partially to the pressure at said source of supply, whereby the pressure of the fluid passing through one tuyère block controls, to a certain extent, the operation of the damper for the next adjacent tuyère block of the series.

4. In a device of the class described, the combination with an inclined series of tuyère blocks having passages therebetween adapted to receive the fluid from a source of supply, of a fluid control unit operatively associated with said tuyère blocks for controlling the flow of fluid therethrough, said control unit comprising a framework having a series of cross members arranged in spaced relation, one of said cross members engaging the forward end of each tuyère block, a plurality of dampers pivotally supported in said framework, one of said dampers being operatively associated with each of said cross members, said dampers being disposed in partially overlapping relation so that one side of each is subjected to the pressure of the fluid in its associated passage, while the other side thereof is subjected partially to the pressure of the fluid in the next lower passage, and partially to the pressure at said source of supply, whereby when the differential pressure exceeds a predetermined value said dampers will move toward closed position.

5. In a device of the class described, the combination with an inclined series of tuyère blocks having passages therebetween adapted to receive the fluid from a source of supply, of a fluid control unit operatively associated with said tuyère blocks for controlling the flow of fluid therethrough, said control unit comprising a framework having a series of cross members, one of said cross members engaging the forward end of each tuyère block, a plurality of dampers pivotally supported in said framework, one of said dampers being operatively associated with each of said cross members, said dampers being disposed in partially overlapping relation so that one side of each is subjected to the pressure of the fluid in its associated passage, while the other side thereof is subjected partially to the pressure of the fluid in the next lower passage and partially to the pressure at said source of supply, whereby when the differential pressure exceeds a predetermined value said dampers will move toward closed position, and means for holding said dampers in substantially open position until said differential pressure exceeds a predetermined value.

6. In a device of the class described, the combination of an inclined series of tuyère blocks having passages therebetween adapted to receive fluid from a source of supply, one or more units for controlling the flow of fluid to said tuyère blocks, each of said control units comprising a framework consisting of a pair of spaced side walls, and a series of transverse cross members connecting said side walls, one of said cross members engaging the forward end of each of said tuyères, a plurality of dampers pivotally supported in said framework, there being one damper provided for each of said tuyère blocks, each of said dampers comprising a pair of flat angularly disposed top portions arranged in offset relation, and a substantially flat bottom portion, said portions terminating at their rearwardly disposed ends in an arcuate portion adapted to engage an associated cross member, said dampers being disposed in partially overlapping relation so that one side of each is subjected to the pressure of the fluid flowing through its associated passage, while the other side thereof is subjected partially to the pressure of the fluid flowing through the next lower passage, and partially to the pressure at said source of supply, whereby when the differential pressure acting on any of said dampers exceeds a predetermined value it will move toward closed position.

7. In a device of the class described, the combination of an inclined series of tuyère blocks having passages therebetween adapted to receive fluid from a source of supply, one or more units for controlling the flow of fluid to said tuyère blocks, each of said control units comprising a framework consisting of a pair of spaced side walls, and a series of transverse cross members connecting said side walls, one of said cross members engaging the forward end of each of said tuyères, a plurality of dampers pivotally supported in said framework, there being one damper provided for each of said tuyère blocks, each of said dampers comprising a pair of flat, angularly disposed top portions arranged in offset relation, and a substantially flat bottom portion, said portions terminating at their rearwardly disposed ends in an arcuate portion adapted to engage an associated cross member, said dampers being disposed in partially overlapping relation so that one side of each is subjected to the pressure of the fluid flowing through its associated passages, while the other side thereof is subjected partially to the pressure of the fluid flowing through the next lower passage, and partially to the pressure at said source of supply, whereby when the differential pressure acting on any of said dampers exceeds a predetermined value it will move toward closed position, and means for holding said dampers in substantially open position until said differential pressure exceeds a predetermined value.

8. In a device of the class described, the combination with two or more tuyère blocks having passages therebetween adapted to receive fluid from a source of supply, of a damper disposed adjacent each of said tuyère blocks for controlling the flow of fluid through its associated passage, said dampers being so disposed that each overlaps, at least in part, the adjacent dampers so that one side of each damper is subjected to the pressure of the fluid in its associated passage, while the other side thereof is subjected at least in part, to the pressure of the fluid in an adjacent passage, whereby when the differential pressure exceeds a predetermined value said dampers move to closed position.

9. In a device of the class described, the combination with two or more substantially horizontally disposed tuyère blocks, arranged in superimposed stepped relation, said tuyère blocks having passages therebetween adapted to receive fluid from a source of supply, of a pivotally mounted damper disposed adjacent each of said tuyère blocks for controlling the flow of fluid through its associated passage, said dampers being so arranged as to overlap at least in part, so that one side of each damper is subjected to the pressure of the fluid in its associated passage, while the other side thereof is subjected at least in part to the pressure of the fluid in an adjacent passage, whereby when the differential pressure exceeds a predetermined value said dampers move to closed position.

10. In a device of the class described, the combination of an air control unit adapted for assembly beneath the tuyère blocks of a stoker, said unit comprising a framework having a series of spaced cross members adapted to engage the ends of said tuyère blocks and forming with said tuyère blocks passages for draft air, and a series of dampers pivotally mounted on said framework adjacent said cross members, said dampers being disposed in overlapping relation so that one side of each is subjected to the pressure of the fluid in one of said passages, while the other side thereof is subjected at least in part to the pressure of the fluid in an adjacent passage, whereby when the differential pressure exceeds a predetermined value said dampers move toward closed position.

WILLIAM V. SAUTER.
HOWARD F. LAWRENCE.